United States Patent
Morgeneier et al.

(10) Patent No.: US 11,853,827 B2
(45) Date of Patent: Dec. 26, 2023

(54) HANDHELD DEVICE

(71) Applicant: DERMALOG JENETRIC GMBH, Hamburg (DE)

(72) Inventors: Dirk Morgeneier, Jena (DE); Roberto Wolfer, Jena (DE)

(73) Assignee: DERMALOG JENETRIC GMBH, Hamburg (DE)

( * ) Notice: Subject to any disclaimer, the term of this patent is extended or adjusted under 35 U.S.C. 154(b) by 0 days.

(21) Appl. No.: 17/846,221

(22) Filed: Jun. 22, 2022

(65) Prior Publication Data
US 2022/0414409 A1 Dec. 29, 2022

(30) Foreign Application Priority Data
Jun. 23, 2021 (DE) .......................... 102021206505.8

(51) Int. Cl.
*G06K 19/07* (2006.01)

(52) U.S. Cl.
CPC ................. *G06K 19/0718* (2013.01)

(58) Field of Classification Search
CPC ..... G06K 19/0718; G06F 21/30; G06F 21/31; G06F 21/32; G06F 1/1607; G06F 1/1656; G06F 1/1684; G06F 1/1686; G06F 1/1696
See application file for complete search history.

(56) References Cited

U.S. PATENT DOCUMENTS

| | | | | |
|---|---|---|---|---|
| 8,749,970 B2* | 6/2014 | Petersson | ................ | G06F 21/32 361/679.02 |
| 8,842,888 B2* | 9/2014 | Pritikin | ................ | G06V 40/67 382/116 |
| D740,797 S * | 10/2015 | Daniel | .................. | D14/250 |
| 10,360,431 B2* | 7/2019 | Gozzini | ................ | G06F 1/1684 |
| 2002/0060243 A1* | 5/2002 | Janiak | ............. | G06Q 20/40145 235/382 |
| 2012/0102332 A1 | 4/2012 | Mullin | | |
| 2013/0336546 A1* | 12/2013 | Pritikin | ................ | G06V 40/70 382/116 |
| 2014/0268516 A1* | 9/2014 | Fathollahi | ................ | H05K 5/03 361/679.01 |
| 2018/0219992 A1* | 8/2018 | Iasso | ..................... | G06V 10/17 |

FOREIGN PATENT DOCUMENTS

| | | |
|---|---|---|
| DE | 102015116026 A1 | 3/2017 |
| DE | 202019106022.0 U1 | 2/2020 |

OTHER PUBLICATIONS

Office action issued by the German Patent and Trademark Office issued in DE102021206505.8, to which this application claims priority, dated Apr. 11, 2022, and English-language translation thereof.

* cited by examiner

*Primary Examiner* — Thien M Le
*Assistant Examiner* — April A Taylor
(74) *Attorney, Agent, or Firm* — Christensen, Fonder, Dardi & Herbert PLLC

(57) ABSTRACT

A handheld device contains a main body and a sensor disposed on the main body, which is configured to sense biometric data of a person. A recess formed in the main body is disposed relative to the sensor such that an electronic device with a light means is temporarily receivable in the recess and positionable in the recess below the sensor.

18 Claims, 3 Drawing Sheets

HANDHELD DEVICE

CROSS REFERENCE TO RELATED APPLICATIONS

This application claims priority to German patent application DE 10 2021 206 505.8 filed on Jun. 23, 2021, which is hereby incorporated by reference in its entirety.

TECHNICAL FIELD

The present invention relates to a handheld, i.e., hand-heldable, device having a sensor configured to capture biometric data of a person, and a kit-of-parts comprising the handheld device and an electronic device.

BACKGROUND

DE202019106022U1 relates to a generic handheld device for recording living skin regions of human autopods and documents.

The device has an image acquisition module, which has a support surface, and a holding unit for a display and operating module, the display and operating module having a display.

The holding unit has a base frame and a folding frame, which can be folded towards each other by means of a mechanical swivel joint.

The image acquisition module is arranged in the base frame, with the support surface facing the folding frame, and the display and control module can be arranged in the folding frame with the display facing away from the base frame.

In an unfolded state of the holding unit, the base frame and the folding frame enclose an angle of less than 90° and greater than 20° with each other, and in a folded state of the holding unit, the image acquisition module can be covered by the display and control module.

The device described in DE202019106022U1 can be used particularly for personal identification during mobile operations, e.g., for a routine check of suspicious persons, an access or a presence check at events or border control on trains, buses or airplanes. Due to its small size, compactness and modular design, it can be permanently carried by border control officers and is thus also spontaneously available for personal identification at any location.

US 2012/0102332 A1 relates to a mobile wireless biometric identification system comprising a biometric detection device, corresponding software and method that make it possible for a commercially available wireless enabled communication device, such as a smartphone, to use a commercially available wireless communication network to store a digital image of a human biometric feature (iris, fingerprint, etc.) via transmission through a secure connection on a central server.

SUMMARY

The present invention is based, among other things, on the objective of providing a handheld device, which is designed to capture biometric data of a person and which has a compactness that is further improved.

The objective is solved by the features of the independent claim. The dependent claims include preferred further embodiments.

Thereafter, the objective is solved by a handheld device comprising a main body, a sensor arranged on the main body and configured to detect biometric data of a person, and a recess formed in the main body and arranged relative to the sensor such that an electronic device with a light means is temporarily receivable in the recess and positionable in the recess below the sensor.

The handheld device can be configured to receive living skin portions of human autopods and optionally documents.

Conceivably, the biometric sensor can face in a same direction as an emission direction of the light means. The sensor can have a contact surface or contact area and be designed for contact-based recording of blood-perfused skin areas of human autopods, in particular a fingerprint of a finger that rests on the contact surface. Conceivably, the sensor is suitable for the simultaneous recording of impressions of several skin areas of human autopods with blood circulation.

The sensor can have an inner or bottom surface on an opposite side to the contact surface, which faces the recess. The indication "bottom" can be understood to mean that the electronic device disposable in the recess is disposed on the side of the sensor where the lower surface is located, when the electronic device is received in the recess. The electronic device, when received in the recess, can be in contact with or spaced from the bottom surface of the sensor.

The recess can be bounded by two or three side walls of the main body laterally and in an insertion direction of the electronic device, and by a rear of the handheld device and a front of the handheld device on which the sensor is disposed.

One possibility for holding or fixing the electronic device, in particular a smartphone and/or tablet, in the recess, a rail for inserting the electronic device (laterally and/or in the longitudinal direction of the handheld device) and a fixing element for fixing the electronic device to the rail can be provided. Conceivably, there can also be a click fastener for fixing the electronic device to the handheld device and/or a means for fixing the electronic device to the handheld device by a rotational movement similar to a bayonet fastener. Additionally or alternatively, an edge or at least one side surface of the main body can be movable to clamp or lock the electronic device in the recess. Additionally or alternatively, a safety leash (so-called safety leash), which is fixed to the main body and can be fixed to the electronic device, for example, via a push button, can be provided. Additionally or alternatively, the main body, particularly in the area of the recess, can have a predefined coefficient of friction that allows the electronic device to be inserted into the recess and prevents the electronic device from sliding out during use of the handheld device. The coefficient of friction can be different from the coefficient of friction of the other surfaces of the handheld device, and in particular can be greater.

The recess can be variable in size so that the recess can accommodate electronic devices with different dimensions. That is, the handheld device can be designed to accommodate a cell phone or smartphone and/or a tablet. A sensor that is designed as a 1- or 2-finger sensor, a sensor that can accommodate 4 fingers at the same time, a sensor that can accommodate the palm (so-called palmprint scanner), and/or a sensor that can pick accommodate the entire hand including fingers can be used.

In other words, the handheld device can be designed to record biometric data of a person. For this purpose, the device can have integrated biometric sensor technology and its own electronics, as well as the option of temporarily holding or supporting another electronic device with a light means, such as a smartphone with a display. The electronic device, e.g., the smartphone and its display, can thus be positioned at least partially below the biometric sensor technology.

This renders the handheld device more compact and handheld than devices in which the electronic device is to be positioned externally, as the electronic device is partially positionable below the biometric sensor during operation of the handheld device.

The sensor can have an optical sensor, which is optionally designed as a shutter pixel sensor. The optical sensor can be designed to capture a fingerprint of the person as biometric data and/or to record documents. Conceivably, the documents can be an identification document, such as a passport.

Conceivably, the sensor is a sensor described in DE 10 2015 116 026 A1. By designing the optical sensor as a shutter pixel sensor, the biometric sensor can be optimized for outdoor applications. An integration time can be adapted to ambient light conditions. Additionally or alternatively, this can allow the sensor to adapt to light means from various electronic devices that can be accommodated in the recess. In particular, a possible adaptability of the sensor sensitivity is advantageous.

The handheld device can include an interface, optionally located in the recess, configured to output biometric data captured by the sensor, optionally to the electronic device.

The interface can be configured to output the data wirelessly and/or wired. In particular, a wireless or wire-free interconnection of the electronic device and the handheld device, for example by communication via WLAN, Bluetooth, NFC or the like, can increase flexibility of use.

The handheld device can include a computer unit configured to drive the sensor and/or process the biometric data captured by the sensor, and optionally output the processed data via the output interface.

The output interface may, additionally or alternatively, function as an input interface and be configured to receive data from an external device, such as the electronic device, and output it to the computer unit of the handheld device, if applicable.

That is, processing of the biometric data recorded by the sensor can be performed in the handheld device itself by providing the computer unit, although, additionally or alternatively, an external device, such as the electronic device, can also be configured to process the biometric data recorded by the sensor.

Processing can mean comparing the biometric data captured by the sensor with data stored in a database. The database can be stored in a local memory in the handheld device and/or the electronic device and, additionally or alternatively, in a cloud.

That is, in addition to its own electronics, the device can also have an integrated rechargeable battery, a computer unit and/or a data transmission unit so that biometric data can be independently recorded and processed and/or, optionally selected, data or images can be sent to the further electronic device.

The handheld device can include an energy storage device and/or an energy supply interface provided for supplying energy to the sensor, the output interface, and/or the computer unit. The energy supply interface can be provided for connection to the electronic device and/or can be arranged in the recess.

In particular, in the case of providing the power supply interface, which can enable wireless and/or wired power transmission, the handheld device cannot require its own energy storage device, such as a battery. This can result in a relatively or comparatively slim structure of the handheld device.

The electrical power required for an operation of the biometric sensor can be provided by the electronic device, optionally in the state in which the electronic device is inserted into the recess. Conceivably, the power supply interface can additionally function as the output interface. Conceivably, the power supply interface can be a USB interface.

The sensor can be at least partially transparent to light of at least a predetermined wavelength. The wavelength, for which the sensor can be at least partially transparent, can correspond to a wavelength of light emitted by the light means.

That is, in the case of providing a smartphone as the electronic device receivable in the recess, the sensor can be transparent to light of at least one wavelength emitted from a display and/or a camera light of the smartphone.

Conceivably, the smartphone display serves as illumination for the biometric object placed on the biometric sensor, i.e., for at least one finger, for example.

Additionally or alternatively, the entire display and/or parts of the display can serve as an interaction surface for an input and/or output of information and/or instructions.

Conceivably, the person whose biometric data is to be captured by means of the biometric sensor technology has to follow instructions for capturing the data, which are displayed on a part of the display that is arranged below the biometric sensor and/or on a part of the display that is not arranged below the biometric sensor. Thus, a guided user action can be achieved.

The recess can be positioned relative to the sensor such that the light means can provide backlighting for the sensor.

Conceivably, in the case of providing a smartphone as the electronic device receivable in the recess, the display of the smartphone can serve as illumination for the object placed on the biometric sensor, i.e., at least one finger, for example.

The sensor can be at least partially touch-sensitive, such that user input is possible by touching the sensor to the electronic device.

It is conceivable, in the case of the provision of a smartphone as the electronic device to be accommodated in the recess, that the display of the smartphone is also touch-sensitive (so-called touch display), so that user inputs on the smartphone are possible via the touch-sensitive sensor and the touch-sensitive display.

The handheld device can include a further light means, optionally a light emitting diode (LED), an organic light emitting diode OLED and/or an active-matrix organic light emitting diode (AMOLED). The further light means can be arranged to couple light into a total internal reflection (TIR) light guide. The handheld device can include such a light guide.

The further light means can be arranged in such a way that it can provide illumination for the object to be accommodated, in particular the finger and/or the document, and subsequently scattered and/or reflected light is detected by the sensor. It is also conceivable, in addition or alternatively, that the further light means is arranged between the first light means, in particular the display or the display lighting, and the sensor, above the sensor and/or to the side of the sensor.

The further light means, which can be in the form of a luminescent layer, for example, can provide improved capture of the biometric data by providing optimized illumination of the objects containing the biometric data.

Conceivably, the further light means is arranged in such a way that a light emitted by the further light means is incident laterally on an object that is placed on top of the sensor.

LEDs can be attached to the device such that, in an on state, they couple light into a skin of a subject whose biometric data is to be captured using the sensor.

The device can have a through hole located in the main body, at the recess and opposite the sensor.

That is, the main body can have a through hole below the sensor or on the back of the main body in the area of the recess. This through hole can be arranged such that a camera of the smartphone located in the recess is exposed, if the electronic device is a smartphone.

The device can have a through hole located in the main body, at the recess and at the side of the sensor.

That is, the main body can have a through hole below and adjacent to the sensor in the area of the recess, that is, in a side wall of the main body. This open side wall or edge of the handheld device can be arranged such that one or more side buttons of the smartphone located in the recess are exposed and thus accessible from the outside for user input, if the electronic device is a smartphone.

Conceivably, the handheld device additionally or alternatively has function keys on a side wall thereof. These can be used as controls on the side wall of the main body of the handheld device for switching the biometric sensor on and off (power saving function), for starting the scanning process/recording of biometric data and/or for triggering a recording, i.e., stopping the continuous recording of images, and thus recording and storing one or more images that are in the memory at that time. This is particularly useful when an automated acquisition process/masking device cannot trigger automatically for certain reasons. However, it is also conceivable that these functions for controlling the biometric sensor and/or the recording process are implemented wirelessly or via a cable connection through the electronic device (e.g., mobile phone/tablet, see above).

The device can have a light means arranged on the outside of the main body, optionally opposite or below the sensor, to optionally output a light signal depending on the data detected by the sensor.

That is, a further light means, for example in the form of one or more LEDs, can be attached to the frame or externally to the main body of the handheld device. The illuminating means can be arranged to point in the direction of a person performing an inspection by means of the handheld device. The illuminating means can be used to indicate (e.g., by different colors and/or by means of a pulsating light with different frequencies, etc.) whether a captured fingerprint matches that of a suspect. Additionally or alternatively, the light means can be used to indicate a condition of the handheld device.

Conceivably, an electroluminescent surface can be provided around the biometric sensor on the handheld device. Additionally or alternatively, glass can be provided as a cover layer on the sensor, in particular. on the entire interaction surface or top side of the handheld device facing the user, in order to protect the surface and make it easy to clean and disinfect.

The device can have a protective cap attached to the main body that is at least temporarily flapped over the sensor.

The device can have a lamellar protective structure attached to the main body that is at least temporarily movable over the sensor.

That is, the device can include a cap attached to a rear of the device that, when closed, extends over the biometric sensor and the electronic device, if any, located below the sensor.

Additionally or alternatively, a lamellar structure can be provided that can be pulled over the sensor and the electronic device that can be located below the sensor.

This allows the sensor and any electronic device located below the sensor to be protected when the device is not in operation.

In addition, a kit-of-parts is provided comprising the handheld device described above and an electronic device temporarily receivable in the recess of the device and having a light means.

What is described above with reference to the handheld device also applies analogously to the kit-of-parts and vice versa.

In addition to the kit-of-parts, a system comprising the handheld device described above and an electronic device with a light means temporarily received in the recess of the device can also be provided.

The electronic device can be a smartphone, the display of which and/or a light means disposed on a rear of the smartphone, serves as the light means of the electronic device.

That is, the smartphone can be insertable into the recess such that the display faces the sensor and/or such that the display faces away from the sensor.

In the latter case, a camera light of the smartphone can serve as a light means for the sensor. In particular, the camera light can be used to pulse or flash the biometric object to guarantee a higher contrast for a short time. This can be useful for dry hands, forgery detection, health condition measurement (e.g., pulse, lie detector, etc.).

In addition, in the latter case, the display is turned away from the person whose biometric data is being recorded. This offers the advantage that the person whose biometric data is being recorded cannot see an optional result of a check of the recorded biometric data that can be shown on the display. Rather, only a person performing the verification, such as a security guard, can see the information shown on the screen or display and thus the result of the verification.

The above is also possible, at least in part, in the configuration in which the display faces the sensor. Conceivably, the smartphone display and the smartphone itself are designed to illuminate the sensor with different colors and/or patterns.

With the above described, a handy and compact device can be provided, since the smartphone can be positioned at least partially below the biometric sensor and, if necessary, a user guidance, a user feedback and/or a display indication is possible below the support surface.

The device can therefore be designed in such a way that it can be held and/or operated with one hand. The device can be designed in such a way that it can be used together with various smartphones. Additional lighting is not necessarily required for the optical sensor, as the smartphone display can be used for illumination.

BRIEF DESCRIPTION OF THE DRAWINGS

The disclosure will now be described with reference to the drawings wherein.

DESCRIPTION OF EXEMPLARY EMBODIMENTS

Figure 1:
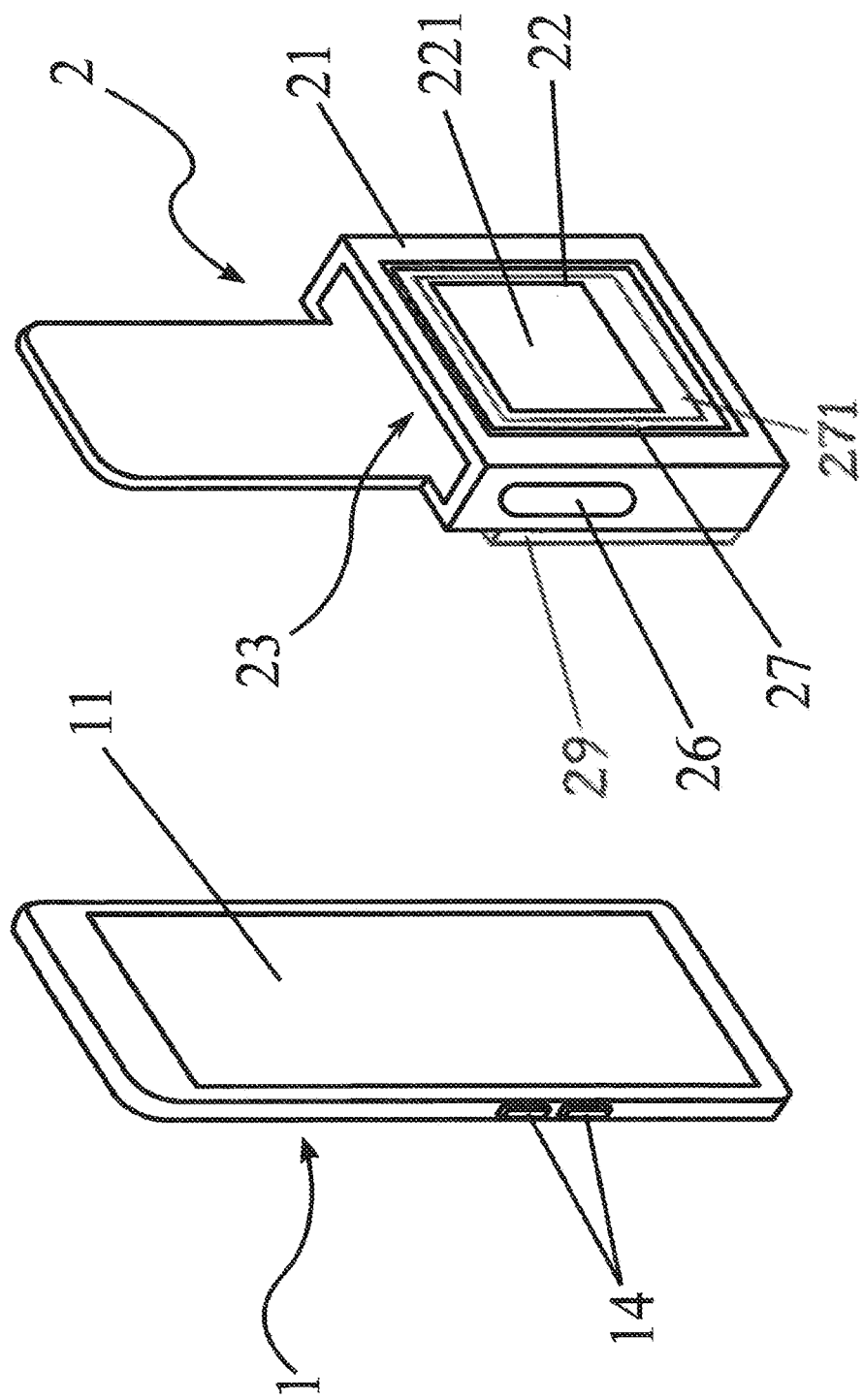
FIG. 1 shows a schematic and perspective view of a front of a kit-of-parts comprising a handheld device and an electronic device temporarily receivable in a recess of the device.

As can be seen from FIG. 1, a kit-of-parts is understood to be the spatial juxtaposition of functionally coordinated individual components, in this case the handheld device 2 and the electronic device 1 in the form of a smartphone.

The handheld device 2 has a main body 21, a sensor 22 disposed on the main body 21, and a recess 23 formed as a blind hole in the main body.

Conceivably, the handheld device could include a protective cap (not shown) that is attached to the main body 21 and that is at least temporarily foldable over the sensor 22, and/or a lamellar protective structure (not shown) that is attached to the main body 21 and that is at least temporarily movable over the sensor 22.

The sensor 22 includes a support surface 221 and is configured to capture one or more fingerprints from a finger or fingers that rest on or are in contact with the support surface 221, as biometric data of a person.

For this purpose, the sensor 22 is implemented as an optical sensor, which can be implemented as a shutter pixel sensor, i.e., the optical sensor can have an adaptability of an integration time of the individual optical sensor pixels forming the optical sensor.

As can be seen in particular from FIG. 2, the recess 23 in the main body 21, shown in FIG. 1, is arranged relative to the sensor 22 in such a way that the smartphone 1 can be temporarily accommodated in the recess 23 in such a way that a display 11 of the smartphone 1 acting as a light means can be positioned in the recess 23 below the sensor 22.

The sensor 22 is partially transparent to light of predetermined wavelengths that at least partially correspond to the wavelengths of light emitted by the display 11 when it is on.

By arranging the display 11 in the recess 23 so that it faces the sensor 22, the display 11 provides a backlight for the sensor 22.

In addition to backlighting by the display 11, information can also be displayed to the person whose biometric data is to be captured in terms of guided user interaction by means of the display 11.

Conceivably, by means of the display 11 a position on the contact surface 221 of the sensor 22 is indicated, at which a finger of the person whose fingerprint is to be captured is to be placed. Additionally or alternatively, it is possible to show which finger or fingers are to be placed, how long the finger or fingers are to be placed, or when a sufficiently good image of the finger or fingers has been captured. It is also conceivable that a notification is integrated for guiding an unrolling of the finger(s).

Since both the sensor 22 in the area of the contact surface 221 and the display 11 are designed to be touch-sensitive, the smartphone 1 can be used to check whether the person whose fingerprint is to be captured has placed the finger at the displayed position.

In other words, user inputs can be made by touching the contact surface 221 of the sensor 22 on the smartphone 1.

Conceivably, the fingerprint, i.e., the biometric data, is recorded or sensed by means of the sensor 22 as soon as the corresponding finger is placed at the position indicated by the display 11.

The handheld device 2 can comprise a computer unit 29. The smartphone 1 can be connected to the handheld device 2 for data transmission via an interface 291 arranged within the recess 23.

The computer unit can be configured to drive the sensor and/or process the biometric data captured by the sensor and optionally output the processed data via the output interface.

The computer unit can be configured to receive the biometric data captured via the support surface 221, filter it according to predetermined criteria if necessary, and output the possibly filtered biometric data to the smartphone 1 via the interface for further processing. In other words, the captured and possibly filtered biometric data can be output from the handheld device 2 to the smartphone 1 via the interface.

The smartphone 1 can be configured to match the biometric data received from the handheld device 2 with a database, which can be stored in a cloud and/or on the smartphone 1, and optionally output a control signal via the interface to the handheld device 2 depending on a result of the matching.

Depending on the control signal received from the smartphone 1 via the interface, the computer unit of the handheld device 2 can be configured to control a light means 24 configured as an LED on a front of the main body 21 of the handheld device 2.

It is conceivable, for example, that a green light signal is emitted by means of the light means 24 when the recorded biometric data matches a data record of the database and a red light is emitted when the recorded biometric data does not match a data record of the database. This can be done, for example, in the case of an access control.

Figure 3:
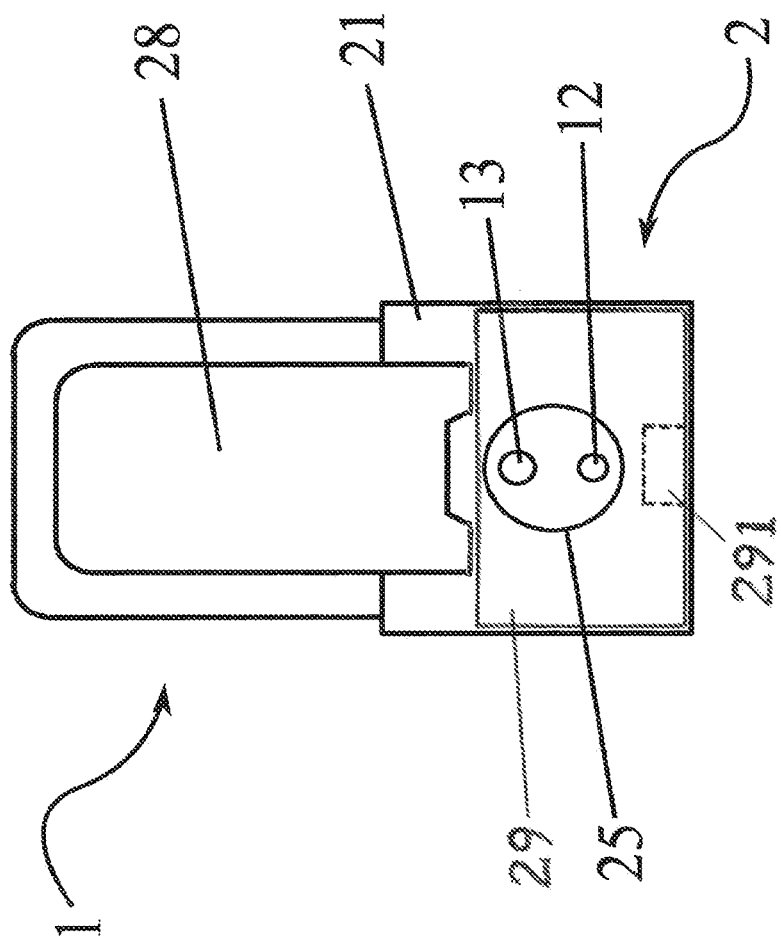
FIG. 3 shows a schematic and perspective view of the rear of the system shown in FIG. 2.

In addition or alternatively, the smartphone 1 can be designed to output a control signal to a camera light 12 (see FIG. 3) of the smartphone 1, which is also designed as an LED, depending on the result of the calibration.

It is conceivable, for example, that a short light signal is emitted when the recorded biometric data matches a data record of the database and a comparatively longer light signal is emitted when the recorded biometric data does not match a data record of the database by means of the camera light means 12. This can be done, for example, during a check of a suspicious person by a security guard.

In order for the camera light means 12 to be perceptible, the main body 21 has a through hole 25 arranged in the main body 21 in the area of the recess and optionally opposite the sensor 22, i.e., at the back of the handheld device 2.

In the present case, the through-hole 25 on the rear of the handheld device 2 is arranged and dimensioned in such a way that not only the camera light means 12 is arranged in the region of the through-hole 25 but also a camera 13 of the smartphone 1 is arranged in the region of the through-hole 25. This offers, among other things, the advantage that by means of the camera 13 a photo can be taken of the person (e.g., a suspect) whose biometric data is to be recorded, without having to pull the cell phone out of the holder. In this way, the photo taken by means of the camera 13 can then be directly, quickly and easily assigned to the biometric data recorded by means of the sensor 22, in particular a fingerprint.

It would also be conceivable to insert the smartphone 1 into the recess 23 of the handheld device 2 rotated by 180° about the longitudinal direction of the smartphone 1, so that the camera light means 12 and the camera 13 face the front and the sensor 22, respectively.

To ensure substantially complete operability of the smartphone 1, even when inserted, the main body 21 can have a through hole 26 (indicated in FIGS. 1 and 2) arranged laterally in the main body 21, in the region of the recess 23 and laterally of the sensor 22. Thus, the buttons 14 arranged laterally on the smartphone 1 (see FIG. 2) can be accessible to a user even when the smartphone 1 is arranged in the handheld device 2.

Figure 2:
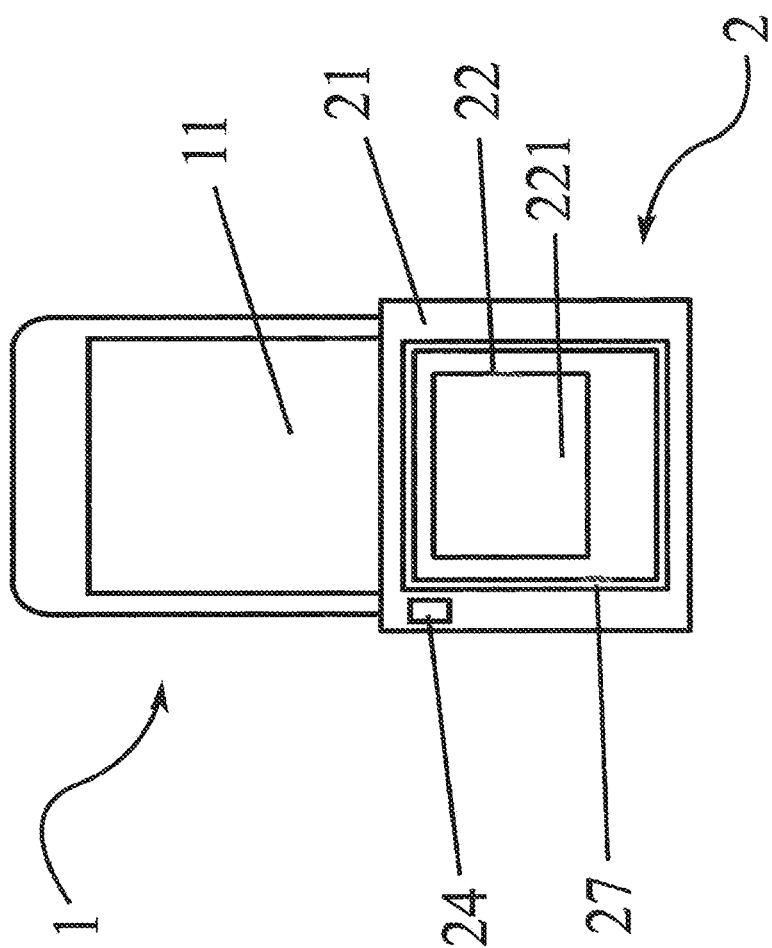
FIG. 2 shows a schematic and perspective view of the front of a system comprising the handheld device and the electronic device of FIG. 1 temporarily received in the recess of the device.

In addition or alternatively to the backlighting provided by the smartphone 1, the handheld device 2 can include, as indicated in FIGS. 1 and 2, a further light means 27 that optionally couples light, into a TIR light guide 271. The further light means can be, for example, an LED, an OLED and/or an AMOLED. Presently, the further light means 27 is arranged circumferentially laterally of the sensor 22. By means of the further light means 27, the support surface 221 can be illuminated, if necessary, controlled via the computer unit of the handheld device 2 and/or the smartphone 1.

In order to operate the electronic components described above, i.e., the sensor 22, the interface, the light means 24, the further light means 27 and/or the computer unit, the handheld device 2 has an energy storage device 28, in the form of a rechargeable battery in the present embodiment, at the rear of the main body 21.

It would also be conceivable to supply energy via an energy supply interface, such as the interface arranged in the recess, so that optionally the energy storage device 28 could be omitted and the handheld device becomes smaller/more compact and thus more handheld. In particular, the smartphone 1 could then be used to supply energy.

LIST OF REFERENCE SIGNS

1 smartphone
11 display
12 camera light means
13 camera
14 lateral keys
2 handheld device
21 main body
22 sensor at front of main body
221 support surface at front of main body
23 recess in the main body
24 light means at the front of the main body
25 through hole at rear of main body
26 through hole on side wall of main body
27 further light means at the front of the main body
28 energy storage at rear of main body

The invention claimed is:

1. A handheld device comprising:
   a main body;
   a sensor arranged on the main body and configured to detect biometric data of a person; and
   a recess formed in the main body and arranged relative to the sensor such that an electronic device with light means is temporarily receivable in the recess and positionable in the recess below the sensor,
   wherein the sensor is at least partially transparent to light of at least a predetermined wavelength, and/or
   wherein the recess is arranged relative to the sensor such that the light means of the electronic device provide a background illumination for the sensor.

2. The handheld device according to claim 1, wherein the sensor comprises an optical sensor, and wherein the sensor is configured to capture a fingerprint of a person as biometric data and/or to capture documents.

3. The handheld device according to claim 2, wherein the optical sensor is configured as a shutter pixel sensor, and/or wherein the captured document is a passport document.

4. The handheld device according to claim 1, wherein the handheld device comprises an interface configured to output the biometric data detected by the sensor.

5. The handheld device according to claim 4, wherein the interface is arranged in the recess, and wherein the biometric data is output to the electronic device.

6. The handheld device according to claim 1, wherein the handheld device comprises a computer unit configured to control the sensor and/or to process the biometric data detected by the sensor.

7. The handheld device according to claim 6, wherein the computer unit is configured to output the processed data via the interface.

8. The handheld device according to claim 1, wherein the handheld device comprises an energy storage device and/or an energy supply interface for supplying energy to the sensor, an interface and/or a computer unit.

9. The handheld device according to claim 8, wherein the energy storage device and/or the energy supply interface is provided for connection to the electronic device and/or wherein the energy storage device and/or the energy supply interface is arranged in the recess.

10. The handheld device according to claim 1, wherein the sensor is at least partially touch-sensitive, such that user input is possible by touching the sensor on the handheld device.

11. The handled device according to claim 1,
    wherein the handheld device comprises further light means,
    wherein the further light means are arranged to provide illumination to the sensor, and/or arranged between the light means and the sensor, above the sensor, and/or laterally of the sensor.

12. The handheld device according to claim 11, wherein the further light means are a light emitting diode (LED), an organic light emitting diode (OLED), or an active-matrix organic light emitting diode (AMOLED), and/or
    wherein the further light means are arranged such that they can provide illumination to the sensor, and/or
    wherein the further light means are arranged between the light means and the sensor, above the sensor, and/or laterally of the sensor, and/or
    wherein the handheld device further comprises a total internal reflection (TIR) light guide arranged such that the further light means couples light into the TIR light guide.

13. The handheld device according to claim 1,
    wherein the handheld device has a through hole arranged at the main body, at the recess and opposite the sensor,
    wherein the handheld device has a through hole arranged at the main body, at the recess and laterally of the sensor,
    wherein the handheld device comprises further light means arranged externally at the main body, and/or
    wherein the handheld device comprises a protective cap which is attached to the main body and which is at least temporarily foldable over the sensor.

14. The handheld device according to claim 13, wherein the further light means externally to the main body are arranged opposite the sensor, for outputting a light signal in dependence on the biometric data detected by the sensor.

15. A kit-of-parts comprising the handheld device according to claim 1 and an electronic device, with light means temporarily receivable in the recess of the handheld device.

16. The kit-of-parts according to claim 15, wherein the electronic device is a smartphone, with light means temporarily receivable in the recess of the handheld device.

17. The kit-of-parts according to claim 16, wherein the light means of the smart phone are a display of the smartphone and/or light means arranged at a rear of the smartphone.

18. The handheld device according to claim 1, wherein the predetermined wavelength corresponds to a wavelength of a light emitted by the light means of the electronic device.

* * * * *